(12) United States Patent
Bates et al.

(10) Patent No.: US 11,231,868 B2
(45) Date of Patent: Jan. 25, 2022

(54) SYSTEM AND METHOD FOR PERFORMING COMPUTATIONAL STORAGE UTILIZING A HARDWARE ACCELERATOR

(71) Applicant: EIDETIC COMMUNICATIONS INC., Calgary (CA)

(72) Inventors: Stephen Bates, Canmore (CA); Saeed Fouladi Fard, Calgary (CA)

(73) Assignee: EIDETIC COMMUNICATIONS INC., Calgary (CA)

( * ) Notice: Subject to any disclaimer, the term of this patent is extended or adjusted under 35 U.S.C. 154(b) by 37 days.

(21) Appl. No.: 16/842,583

(22) Filed: Apr. 7, 2020

(65) Prior Publication Data

US 2021/0311633 A1  Oct. 7, 2021

(51) Int. Cl.
G06F 3/06 (2006.01)
G06F 13/42 (2006.01)
G06F 13/40 (2006.01)
G06F 11/14 (2006.01)
G06F 13/16 (2006.01)

(52) U.S. Cl.
CPC ............ *G06F 3/065* (2013.01); *G06F 3/0619* (2013.01); *G06F 3/0673* (2013.01); *G06F 13/1668* (2013.01); *G06F 13/4022* (2013.01); *G06F 13/4282* (2013.01); *G06F 2213/0026* (2013.01)

(58) Field of Classification Search
CPC .. G06F 3/065; G06F 13/4282; G06F 13/4022; G06F 11/1446; G06F 11/1456; G06F 11/1458
See application file for complete search history.

(56) References Cited

U.S. PATENT DOCUMENTS

| 8,655,974 | B2 | 2/2014 | Frey et al. |
| 9,158,540 | B1 | 10/2015 | Tzelnic et al. |
| 10,275,851 | B1* | 4/2019 | Zhao ..................... G06F 9/5044 |
| 2020/0097376 | A1* | 3/2020 | Zhao ................... G06F 11/1666 |

OTHER PUBLICATIONS

Layton., "Real-Time Data Compression's Impact on SSD Throughput Capability," Enterprise Storage, Apr. 12, 2011.

* cited by examiner

*Primary Examiner* — David E Martinez
(74) *Attorney, Agent, or Firm* — Borden Ladner Gervais LLP; Todd Keeler (57) ABSTRACT

A method, a hardware accelerator, and a system for performing computational storage utilizing a hardware accelerator device that includes a dedicated buffer memory residing on the hardware accelerator device and is connected to a central processing unit (CPU) via a bus includes receiving, at the hardware accelerator device, computation data from the CPU computing device via the bus, performing, at the hardware accelerator device, a check pointing operation on the received computation data to generate check point data, storing the generated check point data on the dedicated buffer memory residing on the hardware accelerator device, and transmitting the check point data directly from the dedicated buffer memory to a solid state memory connected to the hardware accelerator device via the bus for storage, wherein transmitting the check point data bypasses the CPU.

14 Claims, 5 Drawing Sheets

SYSTEM AND METHOD FOR PERFORMING COMPUTATIONAL STORAGE UTILIZING A HARDWARE ACCELERATOR

FIELD

The present disclosure relates to performing computational storage utilizing a hardware accelerator.

BACKGROUND

In some computing applications, such as computation operations performed by high performance computing (HPC) systems for example, the computation operation may be halted from time to time so that computation data can be stored. The computation data is stored during the computation operation so that the computation data can be restored if the HPC system crashes mid computation. These computation applications may include computationally intensive simulations, and may take weeks or months to complete. Therefore, being able to restore the computation operation from restored data is desirable over starting the computation operation over from the beginning.

In some applications, computational storage is referred to as "burst buffering" in which a check pointing operation is performed on the computation data, and the check point data is stored to one or more solid state drives (SSDs). In the event of a crash of the HPC system, the stored check point data may be utilized to restore the state of the computational data as of the time of the last burst buffering.

The data is initially stored to more expensive SSDs because of the increased write speed. In burst buffering, initial write speed is important because the computation operation is halted while burst buffering occurs. Typically, after the check point data is stored to one or more SSDs and the computation operation resumes, the data stored to the SSDs is transferred to long-term storage, which is typically less expensive than SSDs.

It is desirable in burst buffer implementations attempt to perform the check pointing operation and write the data to the SSD as quickly as possible in order to minimize the time that the computation is interrupted.

Improvements to computational storage in HPC systems are desired.

BRIEF DESCRIPTION OF THE DRAWINGS

Embodiments of the present disclosure will now be described, by way of example only, with reference to the attached Figures.

DETAILED DESCRIPTION

The present disclosure provides systems and methods for performing computational storage utilizing a hardware accelerator device.

Embodiments of the present disclosure utilize a hardware accelerator device in a high performance computing (HPC) system that receives computation data and performs a check point operation on the computation data, then stores the generated check point data to a dedicated buffer memory residing on the hardware accelerator device, then transmitting the check point data directly to a solid state drive (SSD) without passing through a central processing unity (CPU) of the HPC system. The direct transfer from the hardware accelerator device to the SSD may utilize, for example, peer-to-peer direct memory access (p2pDMA).

Another embodiment of the present disclosure utilizes a hardware accelerator device of a HPC system that directly receives a request for one or more packets of computation data from a requesting device. The read request may be directly received from the requesting device by bypassing the CPU of the HPC system. The hardware accelerator device reads check point data associated with the requested one or more packets of computation data, decompresses the check point data to generate the one or more packets of computation data, and transmits the one or more packets of computation data to the requesting device, bypassing the CPU of the HPC system. The request may be received, and the requested one or more packets of computation data may be transmitted utilizing p2pDMA.

In an embodiment, the present disclosure provides a method for performing computational storage utilizing a hardware accelerator device that includes a dedicated buffer memory residing on the hardware accelerator device and is connected to a central processing unit (CPU) via a bus that includes receiving, at the hardware accelerator device, computation data from the CPU computing device via the bus, performing, at the hardware accelerator device, a check pointing operation on the received computation data to generate check point data, storing the generated check point data on the dedicated buffer memory residing on the hardware accelerator device, and transmitting the check point data directly from the dedicated buffer memory to a solid state memory connected to the hardware accelerator device via the bus for storage, wherein transmitting the check point data bypasses the CPU.

In an example, receiving the computation data comprises receiving a plurality of packets of computation data, each packet comprising W bytes and performing the check pointing operation on the computation data generates a packet of check point data based on each packet of computation data and comprises compressing the computation data.

In an example, transmitting the generated check point data stored on the dedicated buffer memory comprises transmitting a command to the solid state memory to store a $i^{th}$ packet of check point data generated from a $i^{th}$ received packet of computation data to a storage location on the solid state memory given by $(i-1)W$.

In an example, transmitting the generated check point data stored on the dedicated buffer memory comprises transmitting a command to the solid state memory to store the generated check point data on the solid state memory by packing the packets of check point data without gaps such that the check point data generated based on a particular packet is stored at a storage location that immediately follows a last storage location utilized for storing previous check point data generated from an immediately preceding received packet of computation data.

In an example, the method further includes for each packet of check point data stored on the solid state memory: determining, by a device mapper of the CPU, a size of the packet of check point data, and transmitting, by the device mapper, a command to the solid state memory to store metadata that includes the size of the packet of check point data and a storage location on the solid state memory at which the packet of check point data is stored.

In another example, the method further includes receiving, at the device mapper, a read request for one or more packets of computation data, determining, by the device mapper, based on the metadata stored in association with one or more packets of check point data associated with the requested one or more packets of computation data, the sizes and the storage locations of the one or more packets of check point data, transmitting, by the device mapper to the solid state memory that corresponds to the storage location of the packets of check point data, a command to read and the packets of check point data associated with the requested one or more packets of computation data and directly transmit the read packets of check point data to the hardware accelerator device, reading, by the solid state memory, the one or more packets of check point data associated with the requested one or more packets of computation data and directly transmitting the read one or more one or more packets of check point data to the hardware accelerator device, wherein transmitting the packets of check point data bypasses the CPU, processing, by the hardware accelerator device, the one or more packets of check point data received from the solid state memory to generate the requested one or more packets of computation data, and transmitting the requested one or more packets of computation data to a destination.

In another example, receiving the read request at the device mapper comprises receiving the read request from a remote device that is connected to the CPU and the hardware accelerator device via a network interface card (NIC), and transmitting the requested one or more packets of computation data comprises transmitting the computation data directly to the remote device via the NIC such that the transmitted requested one or more packets of computation data bypasses the CPU.

In another example, the one or more packets of check point data read from the solid state memory include compressed data, and processing the one or more packets of check point data received from the solid state memory include decompressing the one or more packets of check point data.

In another embodiment, the present disclosure provides a hardware accelerator device for performing computational storage and connectable to a central processing unit (CPU) and a solid state memory via a bus that includes a dedicated buffer memory residing on the hardware accelerator device, a hardware accelerator in communication with the dedicated buffer memory and configured to receive computation data from the CPU computing device via the bus, perform a check pointing operation on the received computation data to generate check point data, store the generated check point data on the dedicated buffer memory residing on the hardware accelerator device, and transmit the check point data directly from the dedicated buffer memory to a solid state memory connected to the hardware accelerator device via the bus for storage, wherein transmitting the check point data bypasses the CPU.

In another example, the hardware accelerator being configured to receive the computation data comprises the hardware accelerator being configured to receive a plurality of packets of computation data, each packet comprising W bytes, and the hardware accelerator being configured to perform the check pointing operation on the computation data comprising the hardware accelerator being configured to generate a packet of check point data based on each packet of computation data received and to perform compression of the computation data.

In another example, the hardware accelerator being configured to transmit the generated check point data stored on the dedicated buffer memory comprises the hardware accelerator being configured to store a $i^{th}$ packet of check point data generated from a $i^{th}$ received packet of computation data to a storage location on the solid state memory given by $(i-1)W$.

In another example, the hardware accelerator being configured to transmit the generated check point data stored on the dedicated buffer memory comprises the hardware accelerator being configured to store the generated check point data on the solid state memory by packing the packets of check point data without gaps such that the check point data generated based on a particular packet is stored at a storage location that immediately follows a last storage location utilized for storing previous check point data generated from an immediately preceding received packet of computation data.

In another example, the present disclosure provides a system for performing computational storage that includes a central processing unit (CPU), a solid state memory, a hardware accelerator device connected to the CPU and the solid state memory via a bus, the hardware accelerator device that includes a dedicated buffer memory residing on the hardware accelerator device, a hardware accelerator in communication with the dedicated buffer memory and configured to receive computation data from the CPU computing device via the bus, the computation data comprising a plurality of packets of computation data, each packet comprising W bytes, perform a check pointing operation on the received computation data to generate, for each packet of computation data, a packet of check point data, wherein the packet of check point data is compressed, store the generated packets of check point data on the dedicated buffer memory residing on the hardware accelerator device, and transmit the packets of check point data directly from the dedicated buffer memory to a solid state memory connected to the hardware accelerator device via the bus for storage, wherein transmitting the check point data bypasses the CPU, and the CPU configured to determine a size of each packet of check point data, store metadata that includes the size of the packet of check point data and a storage location on the solid state memory at which the packet of check point data is stored.

In another example, the system further includes a network interface card (NIC), and the CPU being configured to receive the read request comprises the CPU being configured to receive the read request from a remote device that is connected to the CPU and the hardware accelerator device via a network interface card (NIC), and the hardware accelerator device being configured to transmit the requested one or more packets of computation data comprises the hardware accelerator device being configured to transmit the computation data directly to the remote device via the NIC such that the transmitted requested one or more packets of computation data bypasses the CPU.

In another example, the one or more packets of check point data read from the solid state memory comprise compressed data, and the hardware accelerator being configured to process the one or more packets of check point data received from the solid state memory comprises the hardware accelerator device being configured to decompress the one or more packets of check point data.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described.

Figure 1:
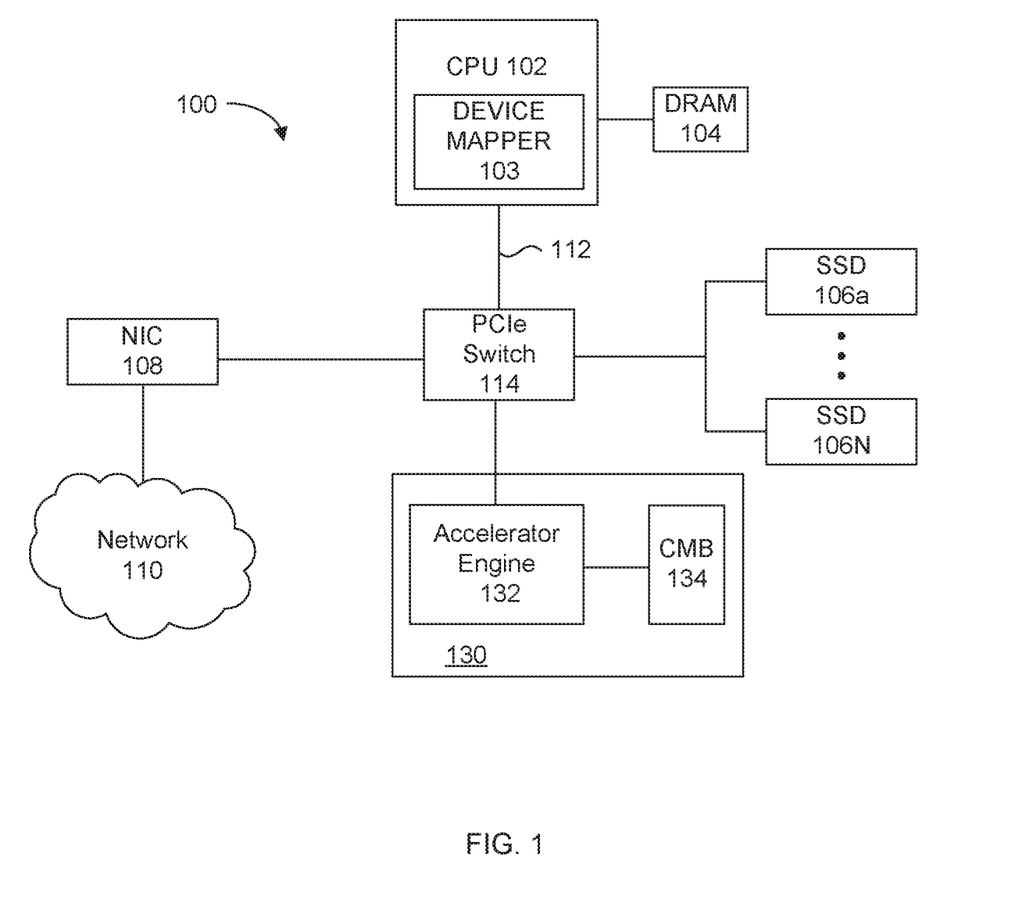
FIG. 1 is a schematic diagram of an example high performance computing system in accordance with the present disclosure.

Referring to FIG. 1, an example of a HPC system 100 in accordance with the present disclosure is shown. The HPC system 100 includes a host CPU 102, a dynamic random access memory (DRAM) 104 associated with the host CPU 102, one or more solid state drives (SSD) 106a-106N, a network interface card (NIC) 108, and a hardware accelerator device 130 connected to the host CPU 102. The hardware accelerator device 130 includes an accelerator engine 132 and a Control Memory Buffer (CMB) 134 that resides on the hardware accelerator device 130.

In the example HPC system 100 shown in FIG. 1, the host CPU 102 is connected to the one or more solid state drives (SSD) 106a-106N, the network interface card (NIC) 108, and the hardware accelerator device 130 via a PCIe bus 112 and a PCIe switch 214. However, in other examples, the CPU 102, the one or more solid state drives (SSD) 106a-106N, the network interface card (NIC) 108, and the hardware accelerator device 130 may be connected via any suitable bus operating on any suitable protocol.

The CPU 102 in the example HPC system 100 shown in FIG. 1 includes a device mapper 103, which may be provided as a set of computer-readable instructions stored on the CPU 102. The device mapper 103 may be implemented as a virtual block device, i.e., as software, between the upper layers of the CPU 102 that perform computation operations and lower layers of the hardware accelerator device 130, the SSDs 106a-106N, and the NIC 108. The device mapper may be utilized to perform any of, for example, receiving a write command from a HPC application and transmitting the write data to the hardware accelerator device 130 to be, for example, compressed, determining the result of compression performed by the hardware accelerator device 130 on the write data, formulating the result of the compression, i.e., the compression size, performed by the hardware accelerator device 130 into metadata, and writing the metadata and the compressed data to one or more of the SSDs 106a-106N.

During computation applications, the host CPU 102 performs computation operations that generate computation data. The computation operation may include, for example, a simulation. The computation data may be stored to the DRAM 104 during the calculation operation. From time to time the computation data is transferred for storage in what is sometimes referred to as "burst buffering". During burst buffering, the computation data that is accumulated in the DRAM 104 is sent to the device mapper 103 for storage on one or more of the SSDs 106a-106N such that, if the computation operation performed by the CPU crashes, the computation operation may be restored utilizing the most current computation data stored in the SSDs 106a-106N. As described in more detail below, in the present disclosure, the storage of the computation data is offloaded by the device mapper 103 to the hardware accelerator device 130 to free up processing resources of the CPU 102 and to reduce the amount of time required for the burst buffering operation.

Although the present disclosure describes the HPC system 100 operation in the context of performing burst buffering operations in a HPC context, it is understood that the disclosed systems and methods may be applied to other computational storage operations such as for example computational storage applications performed by data centres.

The NIC 108 enables the HPC system 100 to communicate with remote devices (not shown) via a network 110. The remote devices may include any of, for example, other HPC systems, external storage devices, or any other device configured to communication over the network 110.

The network 110 may be any suitable wired or wireless network, or combination of wired and wireless networks including, for example, a local area network (LAN), or a wide area network (WAN), or a combination thereof.

Figure 2:
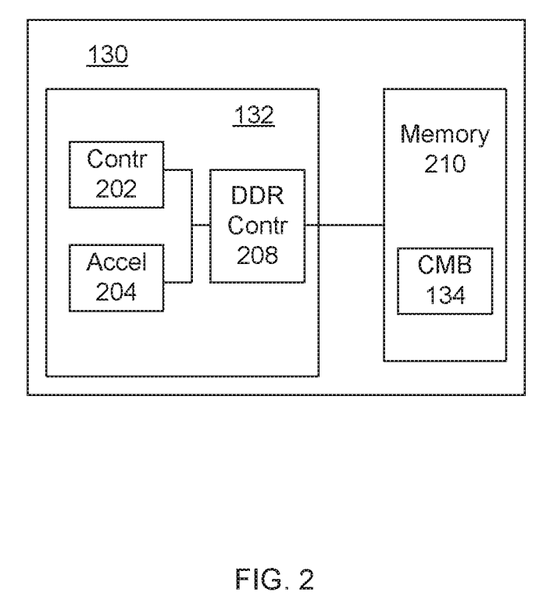
FIG. 2 is a schematic diagram of an example hardware acceleration device included in the example high performance computing system of FIG. 1, in accordance with the present disclosure.

FIG. 2 shows schematic diagram of an example of the components of the accelerator device 130. In the example shown, the accelerator engine 132 includes a controller 202, which includes a direct memory access (DMA) engine, one or more hardware accelerators 204, and a double data rate (DDR) controller 208. The CMB 134 residing on the accelerator device 130 may be included within a memory 210. The CMB 234 may be referred to in the present disclosure as a "dedicated buffer memory" because the CMB 234 is dedicated to providing buffer memory for the hardware accelerator device 130. In the example shown, the CMB 134 is shown residing on the hardware accelerator device 130, however in other examples the CMB 130 may be provided as a separate component from the hardware accelerator device 130 despite being dedicated to the hardware accelerator device 130.

In conventional HPC systems, the check pointing operation on the computation data, and transmitting the generated check point data to an SSD may be performed by CPU of the HPC system. Having the CPU perform the check pointing operation and transmitting the generated check point data utilizes computational resources of the CPU, and, time that the CPU could otherwise use for performing computational operations, such as performing simulations.

In accordance with the present disclosure and referring to FIGS. 1 and 2, the hardware accelerator device 130 of the example HPC system 100 is utilized to offload the check pointing operation from the CPU. The one or more hardware accelerators 204 included in the accelerator engine 132 may include special purpose hardware accelerators for performing check pointing operations utilized in, for example, burst buffer operations. By utilizing specialized hardware accelerators 204 included in the hardware accelerator device 130 for performing check pointing operations, the computational resources of the CPU 102 may be freed up.

For example, unlike conventional HPC systems in which the CPU 102 must spend the time performing the check pointing operation and transmit the generated check point data to a SSD before continuing to perform the computation operation, the CPU 102 of the HPC system 100 of the present disclosure may transmit the computational data to the hardware accelerator device 130 for the check pointing operation, then allocate processing resources back to performing the computation operation once the computation data is sent.

The present disclosure provides an example method for performing computational storage utilizing a hardware accelerator device, such as the example hardware accelerator device 130 described previously with reference to FIGS. 1 and 2. The computational storage that is performed may be, for example, a burst buffering operation in a HPC system.

In the example methods set forth in the present disclosure, movement of data, such as computation data or check point data, into or out of the hardware accelerator device may bypass the CPU. For example, the CPU may be bypassed by transferring data utilizing, for example, p2pDMA. By bypassing the CPU for movement of data into or out of the hardware accelerator device reduces the processing load on the CPU for performing computational data storage.

Figure 3:
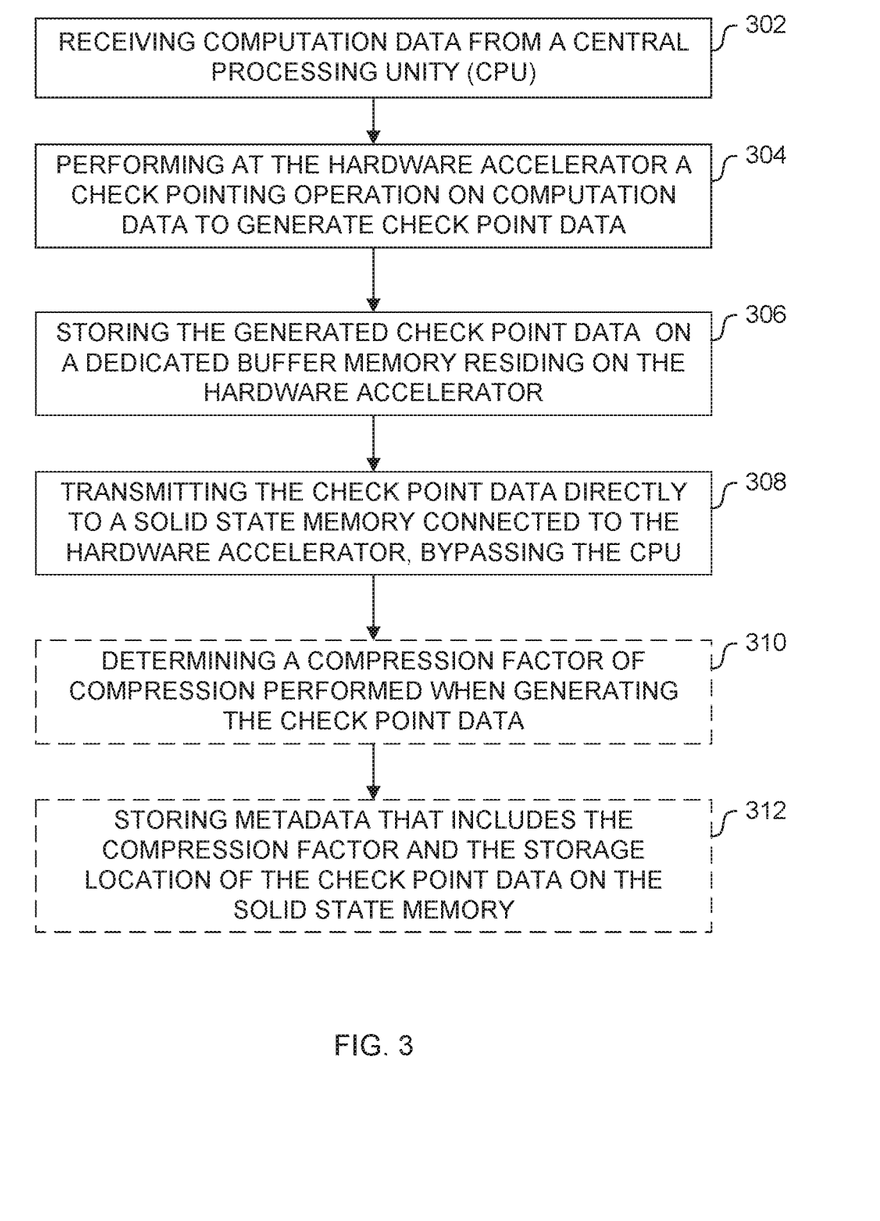
FIG. 3 is a flow chart illustrating a method for performing computational storage utilizing an acceleration device in accordance with the present disclosure.

Referring now to FIG. 3, a flow chart illustrating the example method for performing computational storage utilizing a hardware accelerator device, such as the example hardware accelerator device 130, is shown. The method may be performed by, for example, a processor of a hardware accelerator device that performs instructions stored in a memory of the hardware accelerator device. In other examples, a portion of the method may be performed by a processor of a hardware accelerator device and another portion of the method is performed by a CPU, such as, for example, a device mapper provided on a CPU.

At 302, computation data is received at the hardware accelerator device from a CPU. The CPU may be similar to the example CPU 102 and the hardware accelerator device may be similar to the hardware accelerator device 130 described previously.

In some embodiments, a device mapper of the CPU, such as the example device mapper 103 described previously, sends the computation data that is received at the hardware accelerator device. The computation data may be generated by the CPU during a computation operation, which the CPU may store at a DRAM of the CPU, such as the example DRAM 104 described previously.

In some examples, the computation data received at the hardware accelerator device may be sent by the CPU, for example by the device mapper of the CPU, in response to a particular event or trigger. For example, some HPC simulations may initiate a check point at certain time intervals, for example every 24 hours. In other examples, a check point may be initiated when the simulation reaches a particular stage if the simulation occurs in stages, or when a particular amount of data is generated since a previous check point. Initiating a check point by the device mapper will result in data being transmitting the hardware accelerator device for burst buffering.

In some embodiments, the computation data is received at 302 is receive in discrete packets. The packets of computation data may be received in packets that are all a predetermined size. In the present disclosure, the packet size is referred to as being W bytes, where W is a positive integer.

In an example, the predetermined size, W bytes, of the packets of computation data is selected to be a reasonably large multiple of the size of the logical block address (LBA) utilized by the SSD to which the check point data will be saved. In the present disclosure the size of the LBA is referred to as L, where L is a positive integer. Utilizing packet sizes that are an integer multiple of the LBA size simplifies the metadata of the associated stored data packets, which in turn may increase the speed at which packets may be written to an SSD.

In an example, the size of the LBA of an Non-Volatile Memory Express (NVMe) SSD is L=4 bytes, and the size of the packets may be W=64 kilobytes (KiB) or W=128 KiB.

At 304, the hardware accelerator device performs a check point operation on the received computation data to generate check point data. The check pointing operation that is performed may be any suitable operation for generating check point data.

As noted above, the computation data may be received at 302 in packets. Performing the check point operation on a packet of received computation data generates a packet of generated check point data. For a particular packet of computation data, i, the packet of generated check point data may have a size that is referred to as $n_iL$, where $n_i$ is an integer and L is the LBA size as set out previously.

Generating the check point operation at 304 may desirably include performing compression of the computation data such that $n_iL$ is less than or equal to W. However, in some cases, $n_iL$ may be greater than W.

In an example, the hardware accelerator device may perform the check pointing operation on the computation data as packets are received. In another example, the hardware accelerator device may store the computation data on a dedicated buffer memory residing on the hardware accelerator device, such as CMB 134 described previously, until a predetermined amount of computation data is received, which triggers the initiation of the check pointing on the stored computation data.

At 306, the generated check point data is stored to a dedicated buffer memory residing on the hardware accelerator device, such as the CMB 134 of the hardware accelerator device 130 described previously. The metadata generally includes the compression ratio of each packet. Thus, because generating metadata requires determining which packets of data are compressed and by how much, generating metadata for the packets of data is typically performed as the compression is being performed.

At 308, the hardware accelerator device directly transmits the generated check point data from the dedicated buffer memory to one or more SSDs, such as one or more of the SSDs 106a-106N described previously, in a manner that bypasses the CPU. For example, the hardware accelerator device may transmit the generated check point data to the one or more SSDs utilizing p2pDMA.

Transmitting the generated check point data from the dedicated buffer memory to one or more SSDs may include storing the generated check point data at a particular storage location on the one or more SSDs. For example, the transmitting the generated check point data may include transmitting a command to store the generated check point data at the particular location on the one or more SSDs. As described in more detail below with reference to FIGS. 4A and 4B, the generated check point data may be stored utilizing a simplified storage scheme in order to increase write time of the generated check point data.

The one or more SSDs may be connected to the hardware accelerator device via a bus, such as PCIe bus 112 described previously, and the direct transfer utilizing p2pDMA is between the hardware accelerator device and the SSDs. In other examples, the one or more SSDs may include a remote storage devices that are connected to the hardware accelerator device via a NIC, such as NIC 108 described previously. In this example, the direct transfer utilizing p2pDMA is between the hardware accelerator device and the NIC, which then passes the generated check point data on to the remote SSD.

Transmitting the check point data may comprise sending the check point data to the one or more storage devices, or may comprising sending a pointer to the one or more storage devices with a command for the one or more storage devices to read the data directly from the dedicated buffer memory. The storage device may read the generated check point data from the dedicated buffer memory such that the generated check point data bypasses the CPU.

Optionally at 310, the value $n_i$ of each packet of generated check point data is determined for each packet of the check point data generated at 304, where $n_iL$ is the size of the packet and L is size of the LBA of the one or more SSDs. Compression may result from the check pointing operation that is performed by the hardware accelerator device. The hardware accelerator device may determine how much compression occurs for each packet of generated check point data. The hardware accelerator device may transmit a message to the device mapper that includes the amount of compression for each packet of data compressed by the hardware accelerator device.

Optionally at 312, for each packet of check point data generated at 304, metadata that includes the value of $n_i$ determined at 310 and the storage location of the packet of check point data on the SSDs is generated by the device mapper and stored on the SSDs. The metadata may be generated and stored by the device mapper. The device mapper may generate the metadata that includes the value of $n_i$ by utilizing a value of $n_i$ that is received from a hardware accelerator device that performed the compression, as described previously.

After the generated check point data is stored to the one or more SSDs, the data may be moved to longer term storage, which typically utilize storage devices that are less expensive than SSDs. Any suitable form of storage device may be utilized for long terms storage.

In a burst buffer application, compression may be performed on the received computation data at 304 in order to increase the speed that data is written to the dedicated buffer memory when storing the check point data at 306, rather than to reduce the amount of storage space that the generated check point data occupies which is typically the motivation for performing compression in conventional compression operations. Because, in burst buffering, the data resides on the dedicated buffer memory and the SSDs temporarily until the data is moved to longer term memory, and it is the time that the computation operation at the CPU is halted that is most important, speeding up the burst buffering operation is more desirable than reducing the amount of storage space required to store the compressed data.

Further, because time is the most important factor, the compression algorithm utilized may be chosen to increase the net time saved in storing the computation data.

Similarly, because packing data stored to the SSDs to increase storage efficiency is not as relevant in burst buffering as write time, and because the check point data is stored in the SSDs temporarily and therefore modifying and overwriting the check point data is typically not required, various storage schemes in the SSDs not typically used in storage applications generally may be utilized in a burst buffering operation. Utilizing simplified storage schemes may result in reduced time for the burst buffering operation by simplifying the generation of metadata at 312. Simplifying the generation of metadata by utilizing a simplified storage scheme may decrease the time and processing resources required to generate the metadata.

Figure 4A:
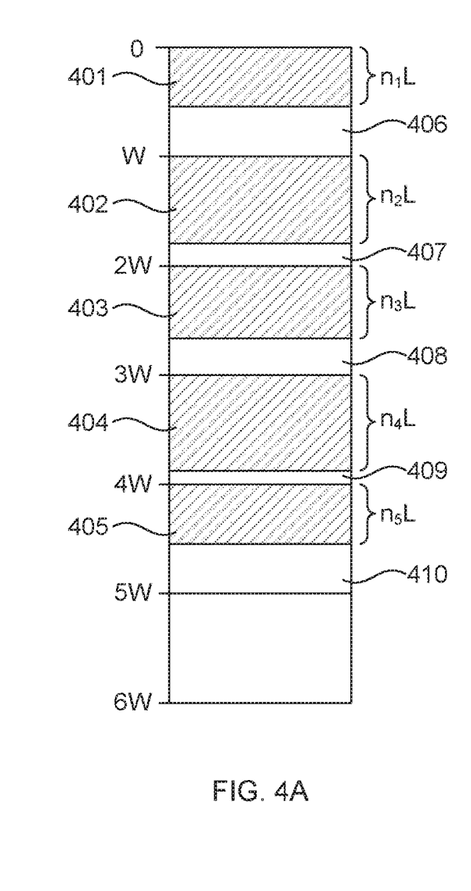
FIGS. 4A and 4B are schematic representations of example storage schemes for computational storage in accordance with the present disclosure.
Figure 4B:
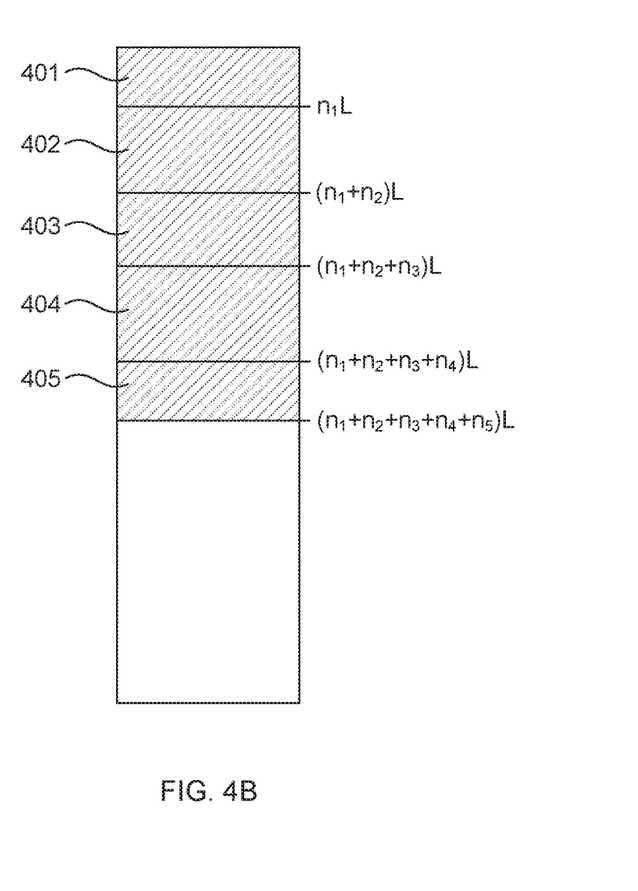

FIGS. 4A and 4B include schematic diagrams illustrating two example simplified storage schemes. FIGS. 4A and 4B each show a portion of an SSD 400, which may be any of the SSDs 106a-106N. The portion of the SSD 400 has a storage capacity of 6W. Five packets of check point data 401-405 stored thereon. In the examples shown in FIGS. 4A and 4B, compression was performed when generating the check point data such that each packet of check point data having a size $n_iL$ which is less than the size, W, of the packets of computation data from which the packets of check point data 401-405 were generated. In other examples, the packets of check point data 401-405 may not have been compressed; and may have size equal to the packet size of the computation data, W, or; in the example shown in FIG. 4B, may be larger than the size of the computation data, W.

In the example storage scheme shown in FIG. 4A, each packet of check point data 401-405 is allowed W bytes of space, which is the size of the uncompressed computation data. Because the packets of generated check point data are compressed, the size of each packet, $n_iL$, is less than or equal to W. Although this leaves gaps 406-410 between each of the packets of check point data 401-405, packing data efficiently on the SSD 400 is not as important in burst buffering operations as writing data quickly. In this example, the storage location for the $i^{th}$ packets is given by (i-1)W. Data write speed is increased because the storage locations of each packet, and thus the metadata that includes the storage location, is simple to create compared with data that is packed according to a packing algorithm that may be utilized in typical storage applications.

In the example shown in FIG. 4B, a packet of check point data is written directly after the previous packet of check point data ends, rather than containing small gaps between data that are included in typical storage applications.

For example, typical data packing algorithms will include gaps between blocks of data to allow for an increase in the data size if the data is subsequently modified and re-written. Because the SSD 400 is cleared after the packets of data 401-405 are stored in long term storage, such read/write/modify operations do not occur. Therefore, in burst buffer applications, these small gaps between the packets of check point are not necessary.

Writing a subsequent packet check point directly after the previous packet of check point data ends, as illustrated in FIG. 4B, simplifies the determination of the storage location of each packet to determining the sum of the $n_i$ for the previous packets times L. Because the values of $n_i$ is determined to generate the metadata for the packets of check point data 401-405 stored on the SSD, determining storage location is a straightforward sum of the $n_i$ values.

Figure 5:
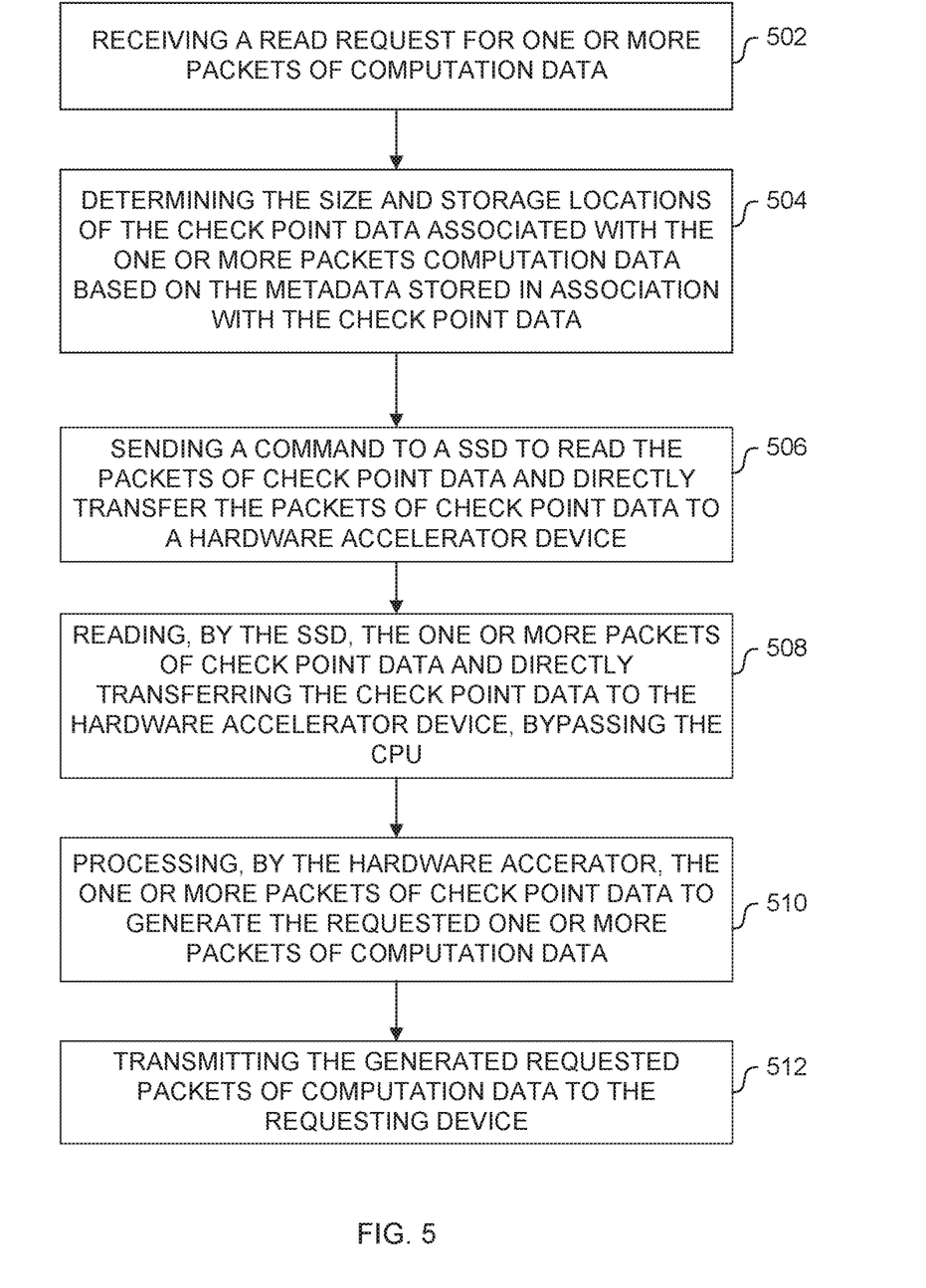
FIG. 5 is a flow chart illustrating a method for reading computation data stored in accordance with the method of FIG. 3 utilizing an accelerator device in accordance with the present disclosure.

Referring now to FIG. 5, a flow chart illustrating a method for responding to a read request for stored computation data is provided that utilizes a hardware accelerator device and direct transfers of data that bypass the CPU. The method may be implemented in the example HPC system 100 described above. Different portions of the method may be performed by different components of the HPC system 100 including, for example, the device mapper of the CPU, such as device mapper 103 of the CPU 102 described previously, and processors provided in the hardware accelerator device and the SSDs, such as the hardware accelerator device 130 and the SSDs 106a-106N described previously.

At 502, a read request for one or more packets of computation data is received at a device mapper of a CPU, such as device mapper 103 of the CPU 102 described previously. The read request may be received at the device mapper 103 from upper layers of the CPU, or may be received from a requesting device. The requesting device may be some other computing device that is connected to the CPU that includes the device mapper. In an example, the requesting device is a remote device and the read request is received at the device mapper over a network via a NIC of the HPC system, such as network 110 and the NIC 108 described previously.

The device mapper determines a size and a storage location of the packets of check point data that correspond to the requested one or more packets of computation data based on metadata for the requested packets of computation data. The device mapper then sends a command to the SSD on which the packets of check point data is stored on to read the data and directly transfer the data utilizing, for example, p2pDMA, to a hardware accelerator device such that the transfer of data bypasses the CPU. The hardware accelerator device then processes the packets of check point data to generate the requested computation data, then transfers the computation data to the device mapper, or to some other device.

At 504, the device mapper determines the size and the storage location of the of the packets of check point data stored on an SSD, such as the SSDs 106-106N describe previously, that correspond to the requested one or more packets of computation data. The size and the storage location may be determined utilizing metadata that corresponds to the packets of check point data that correspond to the requested one or more packets of computation data. The size of a packet of check point data may be determined utilizing the $n_i$ value of that packet, as described previously.

At 506, the device mapper sends a command to one or more SSDs on which the packets of check point data corresponding to the requested one or more computation data are stored. The command may instruct the SSD to read the one or more packets of check point data and transfer the read packets of check point data directly to a hardware acceleration device, such as the hardware acceleration device 130 describe previously, such that the transfer to the packets of check point data bypass the CPU.

At 508, the SSD reads the packets of check point data and directly transfers the packets of check point data to the hardware accelerator device, bypassing the CPU. The direct transfer of the packets of check point data may be performed utilizing, for example, p2pDMA.

At 510, the hardware accelerator device processes the packets of check point data to generate the requesting packets of computation data. If the check point data is compressed, then processing the packets of check point data at 508 may include decompressing the check point data.

At 512, the hardware accelerator device transfers the generated requested computation data. In the case in which the read request received at 502 originated at the upper layers of the CPU, then the generated requested computation data is transferred to the device mapper at 512. In the case in which the read request received at 502 originated at a requesting device other than the CPU, then the generated requested computation data is transferred to the requesting device. Transferring the generated requested computation data may be directly to the requesting device, bypassing the CPU. In the case in which the requesting device is a remote device, then the generated requested computation data may be directly transferred to the NIC, then passed on to the remote requesting device via the network. The direct transfer of the generated requested computation data may be performed utilizing, for example, p2pDMA.

The present disclosure provides a hardware accelerator device and method for offloading computation storage from the CPU, which frees processing resources of the CPU for other tasks, such as performing computation operations. The hardware accelerator device may utilize, when used in a burst buffering operation, compression on the computation data prior to storage, which increases the effective write speed and may increase the effective capacity of the SSD memory utilized for storing the compressed data. Effective write speed may also be increased by utilizing a simplified storage scheme for storing generated check point data on the SSD, which makes generating metadata associated with the generated check point faster simpler and therefore faster than utilizing packing algorithms utilized in conventional storage operations. The hardware accelerator device may utilizing direct transfer, bypassing the CPU, when transmitting generated check point data to the SSD.

The present disclosure also provides a HPC system and method for reading computation data by a remote device via a NIC. Transmission of stored check point data from the SSD to the hardware accelerator device, and transmission of the computation data generated based on the stored check point data by the hardware accelerator device to the NIC for passing on to the remote device, may utilize direct transfers which bypass the CPU.

Direct transfers utilized by various components of the disclosed HPC systems may be performed utilizing, for example, p2pDMA. Direct transfers that bypass the CPU reduce the amount of data traffic over a bus compared to conventional HPC systems in which data would pass from the source component to the DRAM of the CPU then from the DRAM of the CPU to the destination component. Further, utilizing direct transfers of data that bypass the CPU increases the power efficient of the HPC system by reducing the number of tasks performed by the CPU to transfer data between component of the HPC system, and frees up processing resources of the CPU for other tasks such as, for example, performing computation operations.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:

1. A method for performing computational storage utilizing a hardware accelerator device that includes a dedicated buffer memory residing on the hardware accelerator device, the hardware accelerator is connected to a central processing unit (CPU) via a bus, the method comprising:
  receiving, at the hardware accelerator device, computation data from the CPU computing device via the bus;
  performing, at the hardware accelerator device, a check pointing operation on the received computation data to generate check point data;
  storing the generated check point data on the dedicated buffer memory residing on the hardware accelerator device;
  transmitting the check point data directly from the dedicated buffer memory to a solid state memory connected to the hardware accelerator device via the bus for storage, wherein transmitting the check point data bypasses the CPU;
  wherein receiving the computation data comprises receiving a plurality of packets of computation data, each packet comprising W bytes and performing the check pointing operation on the computation data generates a packet of check point data based on each packet of computation data and comprises compressing the computation data.

2. The method of claim 1, wherein transmitting the generated check point data stored on the dedicated buffer memory comprises transmitting a command to the solid state memory to store a $i^{th}$ packet of check point data generated from a $i^{th}$ received packet of computation data to a storage location on the solid state memory given by $(i-1)W$.

3. The method of claim 1, wherein transmitting the generated check point data stored on the dedicated buffer memory comprises transmitting a command to the solid state memory to store the generated check point data on the solid state memory by packing the packets of check point data without gaps such that the check point data generated based on a particular packet is stored at a storage location that immediately follows a last storage location utilized for storing previous check point data generated from an immediately preceding received packet of computation data.

4. The method of claim 1, further comprising, for each packet of check point data stored on the solid state memory:
  determining, by a device mapper of the CPU, a size of the packet of check point data;
  transmitting, by the device mapper, a command to the solid state memory to store metadata that includes the size of the packet of check point data and a storage location on the solid state memory at which the packet of check point data is stored.

5. The method of claim 4, further comprising:
  receiving, at the device mapper, a read request for one or more packets of computation data; determining, by the device mapper, based on the metadata stored in association with one or more packets of check point data associated with the requested one or more packets of computation data, the sizes and the storage locations of the one or more packets of check point data;
  transmitting, by the device mapper to the solid state memory that corresponds to the storage location of the packets of check point data, a command to read and the packets of check point data associated with the requested one or more packets of computation data and directly transmit the read packets of check point data to the hardware accelerator device,
  reading, by the solid state memory, the one or more packets of check point data associated with the requested one or more packets of computation data and directly transmitting the read one or more one or more packets of check point data to the hardware accelerator device, wherein transmitting the packets of check point data bypasses the CPU;
  processing, by the hardware accelerator device, the one or more packets of check point data received from the solid state memory to generate the requested one or more packets of computation data; and
  transmitting the requested one or more packets of computation data to a destination.

6. The method of claim 5, wherein:
  receiving the read request at the device mapper comprises receiving the read request from a remote device that is connected to the CPU and the hardware accelerator device via a network interface card (NIC), and
  transmitting the requested one or more packets of computation data comprises transmitting the computation data directly to the remote device via the NIC such that the transmitted requested one or more packets of computation data bypasses the CPU.

7. The method of claim 5, wherein:
  the one or more packets of check point data read from the solid state memory comprise compressed data, and
  processing the one or more packets of check point data received from the solid state memory comprises decompressing the one or more packets of check point data.

8. A hardware accelerator device for performing computational storage and connectable to a central processing unit (CPU) and a solid state memory via a bus, the hardware accelerator device comprising:
  a dedicated buffer memory residing on the hardware accelerator device;
  a hardware accelerator in communication with the dedicated buffer memory and configured to:
    receive computation data from the CPU computing device via the bus;
    perform a check pointing operation on the received computation data to generate check point data;
    store the generated check point data on the dedicated buffer memory residing on the hardware accelerator device; and
    transmit the check point data directly from the dedicated buffer memory to a solid state memory connected to the hardware accelerator device via the bus for storage, wherein transmitting the check point data bypasses the CPU;
  wherein:
    the hardware accelerator being configured to receive the computation data comprises the hardware accelerator being configured to receive a plurality of packets of computation data, each packet comprising W bytes; and
    the hardware accelerator being configured to perform the check pointing operation on the computation data comprising the hardware accelerator being configured to generate a packet of check point data based on each packet of computation data received and to perform compression of the computation data.

9. The hardware accelerator device of claim 8, wherein the hardware accelerator being configured to transmit the generated check point data stored on the dedicated buffer memory comprises the hardware accelerator being configured to store a $i^{th}$ packet of check point data generated from a $i^{th}$ received packet of computation data to a storage location on the solid state memory given by $(i-1)W$.

10. The hardware accelerator device of claim 8, wherein the hardware accelerator being configured to transmit the generated check point data stored on the dedicated buffer memory comprises the hardware accelerator being configured to store the generated check point data on the solid state memory by packing the packets of check point data without gaps such that the check point data generated based on a particular packet is stored at a storage location that immediately follows a last storage location utilized for storing previous check point data generated from an immediately preceding received packet of computation data.

11. A system for performing computational storage comprising:
- a central processing unit (CPU);
- a solid state memory;
- a hardware accelerator device connected to the CPU and the solid state memory via a bus, the hardware accelerator device comprising:
  - a dedicated buffer memory residing on the hardware accelerator device;
  - a hardware accelerator in communication with the dedicated buffer memory and configured to:
    - receive computation data from the CPU computing device via the bus, the computation data comprising a plurality of packets of computation data, each packet comprising W bytes;
    - perform a check pointing operation on the received computation data to generate, for each packet of computation data, a packet of check point data, wherein the packet of check point data is compressed;
    - store the generated packets of check point data on the dedicated buffer memory residing on the hardware accelerator device; and
    - transmit the packets of check point data directly from the dedicated buffer memory to a solid state memory connected to the hardware accelerator device via the bus for storage, wherein transmitting the check point data bypasses the CPU; and
  - the CPU configured to:
    - determine a size of each packet of check point data;
    - store metadata that includes the size of the packet of check point data and a storage location on the solid state memory at which the packet of check point data is stored.

12. The system of claim 11, wherein:
the CPU is further configured to:
  - receive a read request for one or more packets of computation data;
  - determine based on the metadata stored in association with one or more packets of check point data associated with the requested one or more packets of computation data, the sizes and the storage locations of the one or more packets of check point data;
  - transmit to the solid state memory that corresponds to the storage location of the packets of check point data, a command to read and directly transmit the packets of check point data associated with the requested one or more packets of computation data to the hardware accelerator device;

the solid state memory is further configured to read the one or more packets of check point data associated with the requested one or more packets of computation data and directly transmit the read one or more one or more packets of check point data to the hardware accelerator device such that the read packets of check point data bypass the CPU; and the hardware accelerator is further configured to:
  - process the one or more packets of check point data received from the solid state memory to generate the requested one or more packets of computation data; and
  - transmit the requested one or more packets of computation data to a destination.

13. The system of claim 12, further comprising a network interface card (NIC), wherein:
  - the CPU being configured to receive the read request comprises the CPU being configured to receive the read request from a remote device that is connected to the CPU and the hardware accelerator device via a network interface card (NIC), and
  - the hardware accelerator device being configured to transmit the requested one or more packets of computation data comprises the hardware accelerator device being configured to transmit the computation data directly to the remote device via the NIC such that the transmitted requested one or more packets of computation data bypasses the CPU.

14. The system of claim 12, wherein:
  - the one or more packets of check point data read from the solid state memory comprise compressed data, and
  - the hardware accelerator being configured to process the one or more packets of check point data received from the solid state memory comprises the hardware accelerator device being configured to decompress the one or more packets of check point data.

* * * * *